United States Patent
Adachi et al.

(10) Patent No.: US 9,758,113 B2
(45) Date of Patent: Sep. 12, 2017

(54) EXTERIOR MEMBER AND WIRE HARNESS

(71) Applicant: YAZAKI CORPORATION, Tokyo (JP)

(72) Inventors: Hideomi Adachi, Shizuoka (JP); Hidehiko Kuboshima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/208,369

(22) Filed: Jul. 12, 2016

(65) Prior Publication Data

US 2017/0015259 A1 Jan. 19, 2017

(30) Foreign Application Priority Data

Jul. 13, 2015 (JP) .................................. 2015-139544

(51) Int. Cl.
| | | |
|---|---|---|
| *B60R 16/02* | (2006.01) | |
| *H01B 7/00* | (2006.01) | |
| *H02G 3/00* | (2006.01) | |

(52) U.S. Cl.
CPC ....... *B60R 16/0215* (2013.01); *H01B 7/0045* (2013.01); *H02G 3/26* (2013.01)

(58) Field of Classification Search
USPC ...................................................... 174/72 A
See application file for complete search history.

(56) References Cited

U.S. PATENT DOCUMENTS

| | | | | | |
|---|---|---|---|---|---|
| 1,022,943 | A | * | 4/1912 | Hinsky | ................. F16L 11/085 138/124 |
| 3,578,777 | A | * | 5/1971 | DeGain | .................... F16L 11/15 138/121 |
| 4,592,231 | A | * | 6/1986 | Kant | ..................... G01F 23/268 138/121 |
| 5,439,035 | A | * | 8/1995 | Dal Paluú | .............. F16L 11/118 138/121 |
| 5,564,472 | A | * | 10/1996 | Gipperich | ................. F16L 9/06 138/121 |
| 7,874,319 | B2 | * | 1/2011 | Lawrence | ........... B29C 45/1676 138/109 |
| 2010/0045106 | A1 | | 2/2010 | Oga et al. | |

FOREIGN PATENT DOCUMENTS

| | | |
|---|---|---|
| JP | 2010-47032 A | 3/2010 |
| JP | 2014-212615 A | 11/2014 |

\* cited by examiner

*Primary Examiner* — Timothy Thompson
*Assistant Examiner* — Krystal Robinson
(74) *Attorney, Agent, or Firm* — Kenealy Vaidya LLP

(57) ABSTRACT

An exterior member which is tubular and which accommodates and protects one or multiple conductive paths, the exterior member is provided with a non-slit shape and multiple projections which project on a tube inner surface of the exterior member. The multiple projections respectively have substantially arc-like shapes extending in a tube inner peripheral direction, and the multiple projections are arranged zigzag alternately along a tube axial direction.

8 Claims, 16 Drawing Sheets

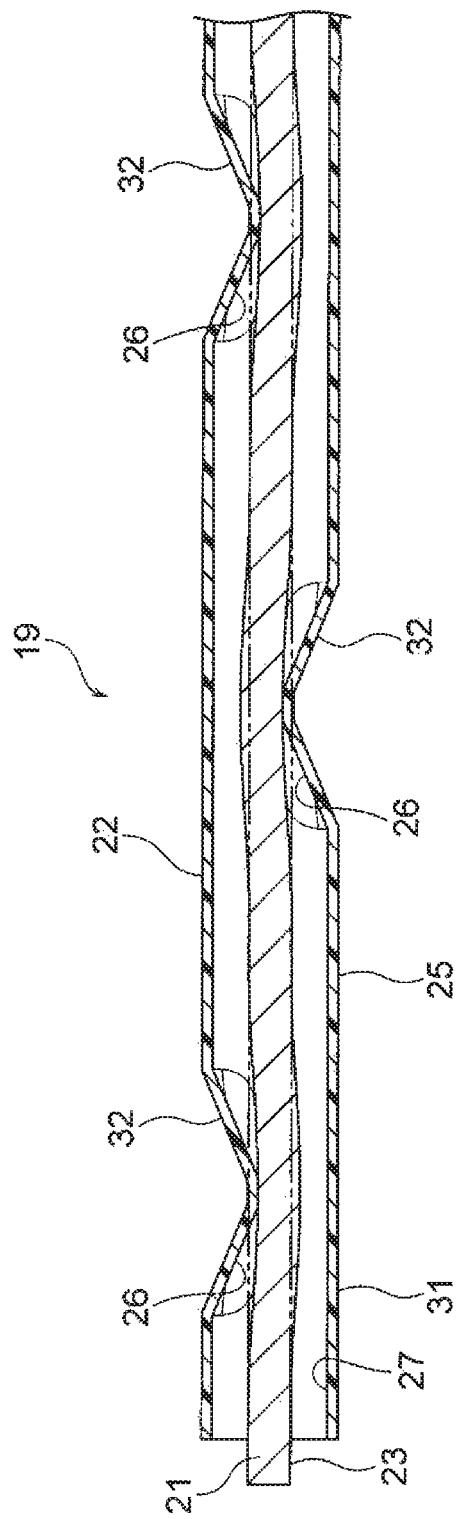

EXTERIOR MEMBER AND WIRE HARNESS

CROSS REFERENCE TO RELATED APPLICATIONS

This application claims priority from Japanese Patent Application No. 2015-139544 filed on Jul. 13, 2015, the entire contents of which are incorporated herein by reference.

BACKGROUND OF THE INVENTION

Field of the Invention

The invention relates to a tubular exterior member for accommodating and protecting one or multiple conductive paths and a wire harness including such exterior member.

Description of Related Art

As an example of a high voltage wire harness, in the below-mentioned patent document 1, there is disclosed a wire harness for electrically connecting together high voltage apparatuses mounted on a hybrid vehicle or an electric vehicle. The wire harness of the patent document 1, which is invented by the same applicant as the present applicant, includes one or multiple conductive paths and a tubular exterior member for accommodating such one or multiple conductive paths for protection. The wire harness of the patent document 1 is a long wire harness to be arranged through the underfloor of the vehicle.

In the wire harness of the patent document 1, the conductive path is fixed at the position of the terminal of the exterior member by winding tape thereon. Also, the conductive path, while being inserted into the exterior member, is also retained by a protector at the front and back positions of the vehicle underfloor. Whether the exterior member or protector, the two end sides of the conductive path are fixed while they are spaced from each other, and the middle portion thereof is accommodated while it is spaced from the exterior member. Thus, in such accommodated state, for example, when vibrations in the vehicle running time are transmitted to the conductive path, there is a fear that the conductive path can be vibrated into contact with the inner surface of the exterior member. That is, there is a fear that scratching or the like can occur on the conductive path side.

Thus, the wire harness of the below-mentioned patent document 2 may be employed to eliminate the above fear. The wire harness of the patent document 2 is constituted of a corrugate tube which has a slit portion. Also, in order that the conductive path inserted through the slit portion can be prevented against vibration, the corrugate tube is also formed to have a shape in which a resilient lip part continues with the slit portion. Tape is wound on the corrugate tube so as to cover the slit portion after insertion of the conductive path.

However, the wire harness of the patent document 2 has the following problem. That is, for example, when stones fly in the vehicle running time, the wound tape can be broken. Thus, for example, when the vehicle splashes water, the water invades into the corrugate tube from the broken-tape portion, thereby finally resulting in failure.
[Patent Literature 1] JP-A-2010-47032
[Patent Literature 2] JP-A-2014-212615

SUMMARY

One or more embodiments provide an exterior member capable of preventing water against invasion and suppressing the movement of a conductive path, and a wire harness containing such exterior member.

In an aspect (1), one or more embodiments provide an exterior member which is tubular and accommodates and protects one or multiple conductive paths. The exterior member is provided with a non-slit shape and multiple projections which project on a tube inner surface of the exterior member, wherein the multiple projections respectively include an extending and substantially arc-like shape in a tube inner peripheral surface direction and are arranged zigzag alternately along a tube axial direction.

In an aspect (2), each of the multiple projections includes a round portion extending in a substantially arc-like shape in a tube inner peripheral direction, and two oblique portions which respectively continue from the round portion to the tube inner surface and are substantially oblique-shaped, and each of the multiple projections includes a section along the tube axial direction which is a substantially U-shaped or V-shaped smooth surface.

In an aspect (3), each of the multiple projections includes a shape extending in a length exceeding a half periphery of the tube inner surface, or in a length equal to or shorter than the half periphery of the tube inner surface.

In an aspect (4), the length of each of the multiple projections is not equal to or not longer than a whole periphery of the tube inner surface.

In an aspect (5), the exterior member is further provided with ribs extending along the tube axial direction. Each of the ribs is on each of recesses which are formed on the tube outer surface of the exterior member by the multiple projections.

In an aspect (6), the exterior member is further provided with a straight tubular part having a straight tube shape. The multiple projections are arranged on the straight tubular part.

In an aspect (7), one or more embodiments provide a wire harness provided with an exterior member according to the aspects (1) to (6), and one or multiple conductive paths to be accommodated into and protected by the exterior member.

According to the aspect (1), since the multiple projections are arranged to positions where the movement of the conductive path must be suppressed, the conductive path can be made difficult to move or can be held not to move. Therefore, according to the invention, the movement of the conductive path within the exterior member can be suppressed at a desired position, thereby enabling prevention of scratching on the conductive path side. Also, according to the invention, since the exterior ember is formed to have a non-slit shape, waterproof property, dustproof property and the like can be secured, thereby enabling elimination of ill effects on the conductive path side.

According to the aspects from (2) to (4), there can be provided an improved shape which can make one or multiple conductive paths difficult to move, can hold them not to move, and can insert, them smoothly.

According to the aspect (5), even when the exterior member has a shape in which the multiple projections cause multiple recesses in the tube outer surface of the exterior member, on such multiple recesses, there are provided ribs respectively extending along the tube axial direction. Thus, for example, even when there is applied to the exterior member a force going in a direction to bend the exterior member, the exterior member is not bent easily at the positions of the recesses, thereby enabling prevention of the lowered rigidity.

According to the aspect (6), since the multiple projections are formed on the straight tube part, the movement of the conductive path within the exterior member can be suppressed at desired positions in the straight tube part. Thus, for example, the movement of the conductive path in a long range such as the vehicle underfloor, thereby enabling prevention of scratch or the like on the conductive path side.

According to the aspect (7), since the wire harness includes an exterior member according to the aspects (1)-(6), the wire harness can provide the above effects. Therefore, according to the invention, there can be provided an improved wire harness.

BRIEF DESCRIPTION OF THE DRAWINGS

FIG. 1A is a typical view of the arrangement of a high voltage wire harness, and FIG. 1B is a typical view of the arrangement of a low voltage wire harness different from FIG. 1A.

FIG. 12A is a view when it is viewed from the J direction and FIG. 12B is a view when viewed from the K direction.

FIG. 14A is a view when viewed from the L direction and FIG. 14B is a section view taken along the G-G line.

FIG. 16 is a section view of the embodiment 3, taken along the I-I line shown in FIG. 15.

DETAILED DESCRIPTION

A wire harness includes a tubular exterior member and a conductive path to be inserted into the exterior member. The exterior member is formed to have a non-slit shape. On the tube inner surface of the exterior member, for example, the middle part thereof, there are formed multiple projections. The projections respectively extend in a substantially arc-like shape in the tube inner peripheral direction. Also, the projections are arranged zigzag alternately along the tube axial direction. Each projection includes an R part substantially in an arc shape in the tube inner peripheral direction and a substantially inclined part continuing from the R part to the tube inner surface. Also, each projection has a shape the section shape of which along the tube axial direction has a substantially U-shaped or V-shaped smooth surface. Further, each projection has a shape extending in the inner peripheral direction with a length exceeding the half periphery of the tube inner surface or with a length equal to or shorter than the half periphery of the tube inner surface.

[Embodiment 1]

Figure 1A:
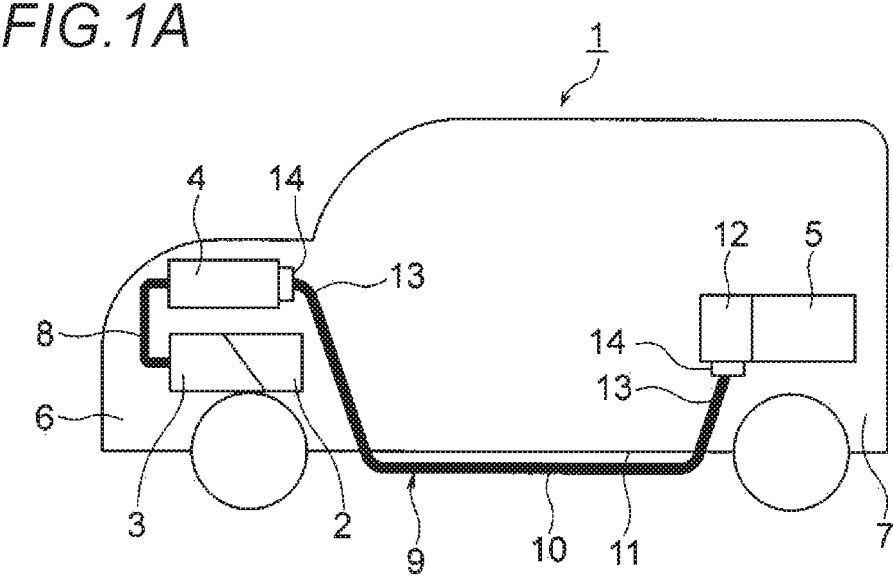
FIGS. 1A and 1B show a wire harness according to an embodiment 1 of the invention.
Figure 1B:
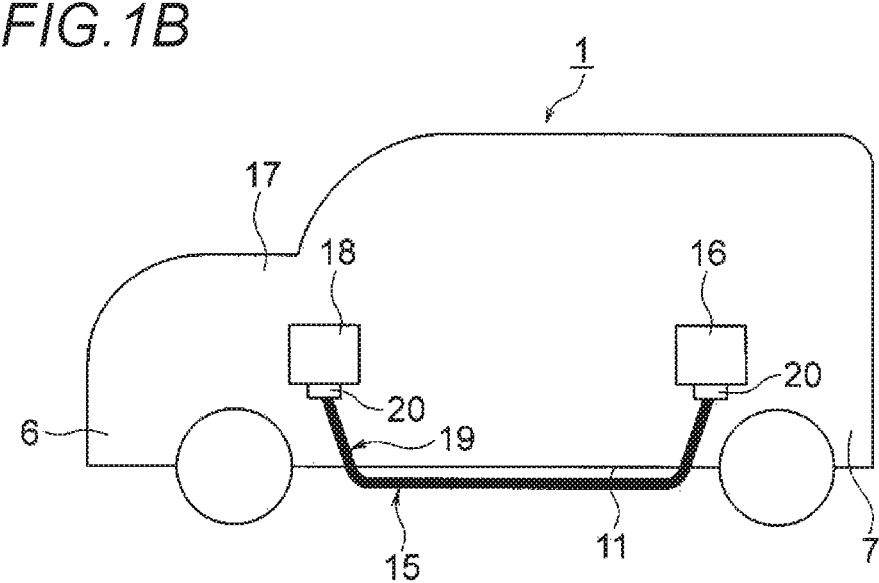
Figure 2:
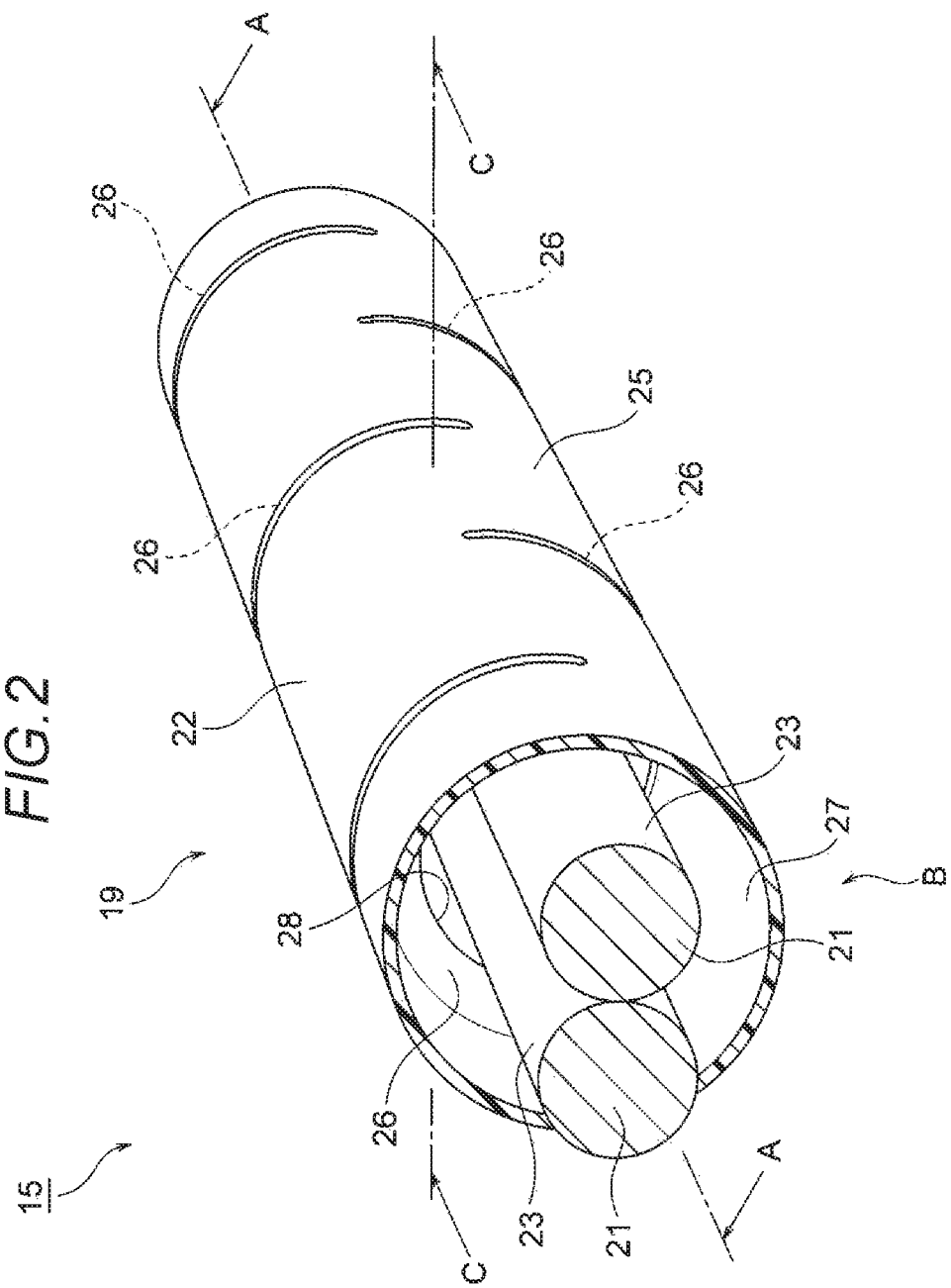
FIG. 2 is a perspective view of an exterior member and a wire harness according to an embodiment 1 of the invention.
Figure 3:
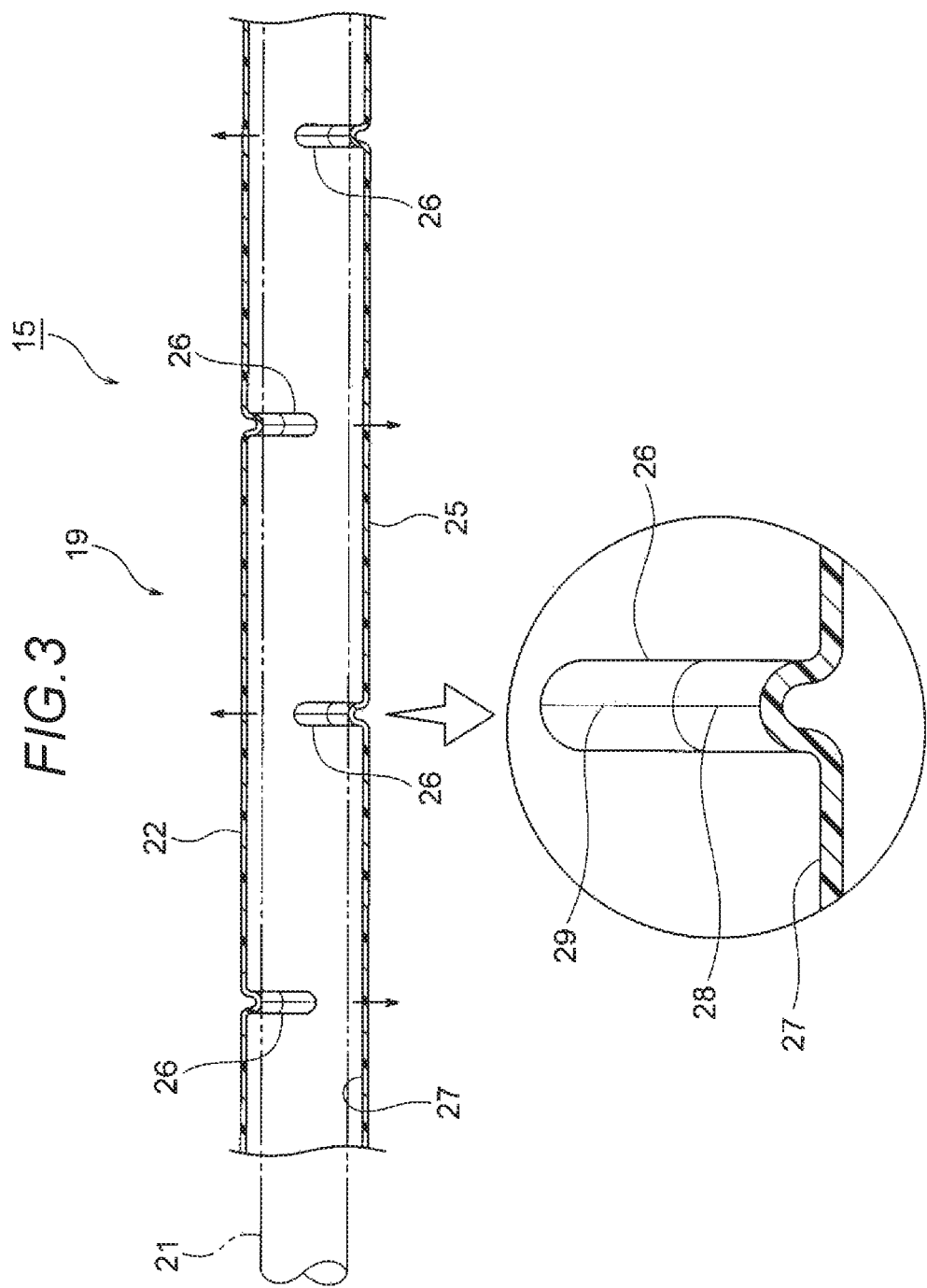
FIG. 3 is a section view of the embodiment 1, taken along the A-A line of FIG. 2.
Figure 4:
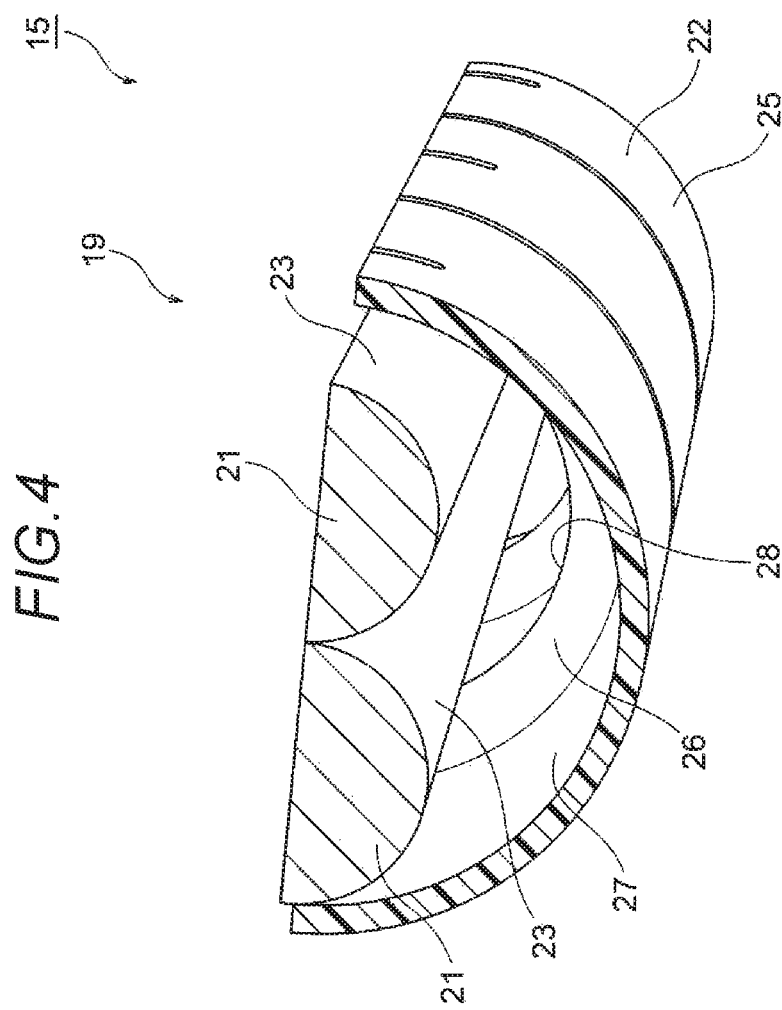
FIG. 4 is a perspective view of the embodiment 1 when viewed from the B direction of FIG. 2.
Figure 5:
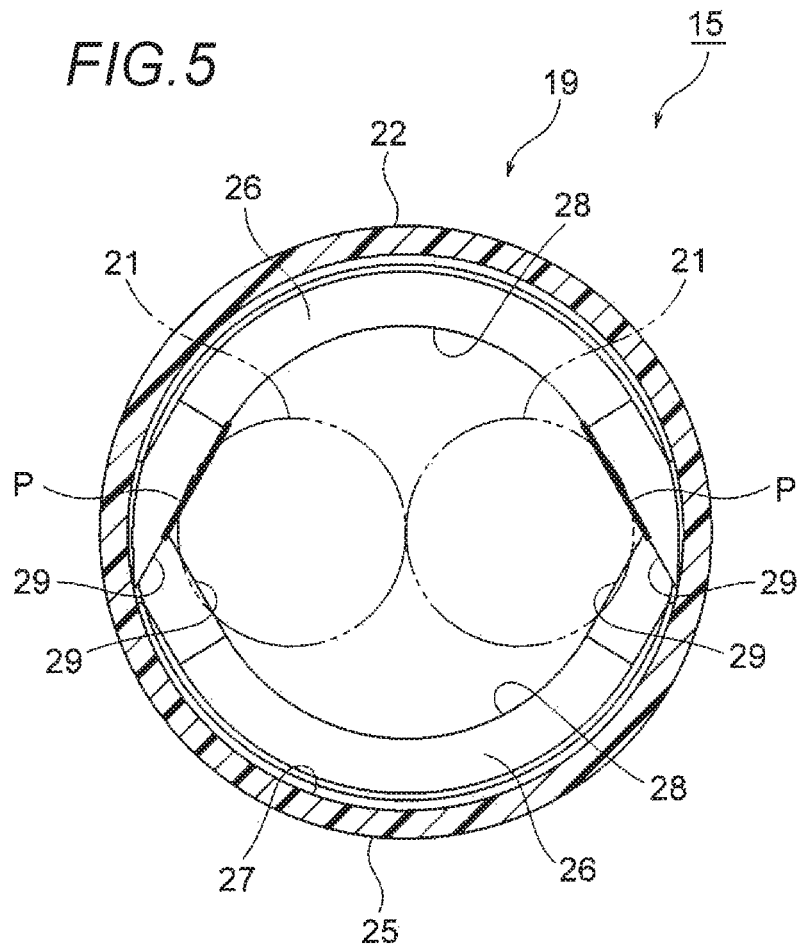
FIG. 5 is a section view of the embodiment 1, taken along the C-C line of FIG. 2.
Figure 6:
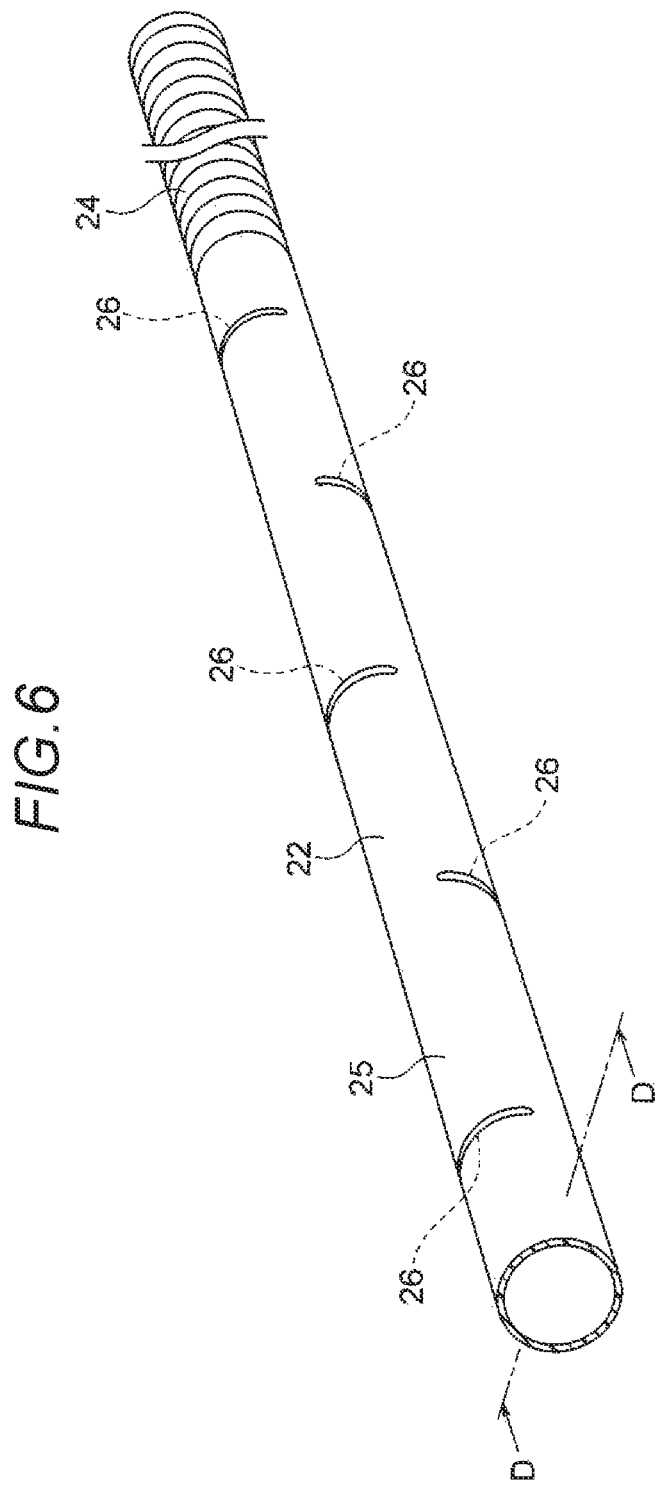
FIG. 6 is a perspective view of only the exterior member of the embodiment 1.
Figure 7:
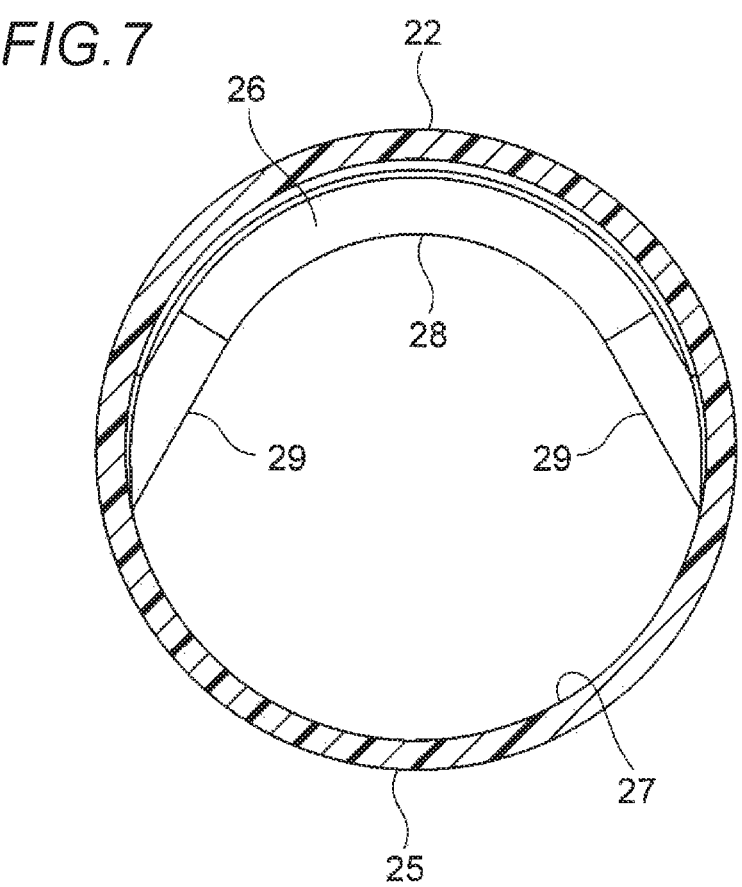
FIG. 7 is a section view of the embodiment 1, taken along the D-D line of FIG. 2.

Description is given below of an embodiment 1 with reference to the drawings. FIGS. 1A and 1B show a wire harness according to the invention. FIG. 1A is a typical view of the arrangement of a high voltage wire harness, and FIG. 1B is a typical view of the arrangement of a low voltage wire harness different from FIG. 1A, FIG. 2 is a perspective view of an exterior member and a wire harness according to the invention. Also, FIG. 3 is a section view taken along the A-A line of FIG. 2. FIG. 4 is a perspective view when viewed from the B direction of FIG. 2. FIG. 5 is a section view taken along the C-C line of FIG. 2. FIG. 6 is a perspective view of only the exterior member. FIG. 7 is a section view taken along the D-D lane of FIG. 2.

In this embodiment, the invention is applied to a wire harness to be arranged in a hybrid vehicle (which may also be an electric vehicle, an ordinary vehicle to be driven by an engine, and the like).

<Manufacture of Hybrid Vehicle 1>

In FIG. 1A, reference numeral 1 designates a hybrid vehicle. The hybrid vehicle 1 is a vehicle to be driven by mixing together two powers of an engine 2 and a motor unit 3, while, power from a battery 5 (battery pack) is supplied to the motor unit 3 through an inverter unit 4. The engine 2, motor unit 3 and inverter unit 4 are mounted in an engine room 6 situated at positions where front wheels and the like are disposed in this embodiment. Also, the battery 5 is mounted in a vehicle rear part 7 (it may also be mounted within a vehicle room existing rearward of the engine room 6).

The motor unit 3 and inverter unit 4 are connected to each other by a high voltage wire harness 8 (motor cable for high voltage). The battery 5 and inverter unit 4 are also connected to each other by a high voltage wire harness 9. With the wire harness 9, the middle part 10 thereof is arranged on a vehicle underfloor 11 (of a vehicle body) of a vehicle. Also, the middle part 10 is arranged along the vehicle underfloor 11. The vehicle underfloor 11 is a well-known body (vehicle body) and is also a so called panel member, while it has at a specific position thereof a penetration hole through which the wire harness 9 is inserted watertight.

The wire harness 9 and battery 5 are connected to each other through a junction block 12 provided on the battery 5. To the junction block 12, there are electrically connected external connecting devices such as a shield connector 14 provided on the rear end side harness terminal 13 of the wire harness 9. Also, the wire harness 9 and inverter unit 4 are electrically connected to each other through external connecting devices such as a shield connector 14 provided on the front end side harness terminal 13.

The motor unit 3 includes a motor and a generator. Also, the inverter unit 4 includes an inverter and a converter. The motor unit 3 is formed as a motor assembly including a shield case. The inverter unit 4 is also formed as an inverter assembly including a shield case. The battery 5 is of a Ni-MH system or a Li-ion system and is modularized.

Here, for example, a storage apparatus such as a capacitor can also be used. Of course, the battery 5 is not limited specifically so long as it can be used in the hybrid vehicle 1 and electric vehicle.

In FIG. 1B, reference numeral 15 designates a wire harness. The wire harness 15 is a low voltage wire harness (wire harness for low voltage) and is provided to electrically connect together a low voltage battery 16 disposed in the vehicle rear part 7 of the hybrid vehicle 1 and a supplementary device 18 (equipment) mounted on a vehicle front part 17. The wire harness 15, similarly to the wire harness 9 of FIG. 1A, is arranged through the vehicle underfloor 11 (this is an example and thus it may also be arranged through the vehicle room side).

As shown in FIGS. 1A and 1B, in the hybrid vehicle 1, there are arranged the high voltage wire harnesses 8, 9 and low voltage wire harness 15. While the invention can apply to any one of the wire harnesses, as a typical example, the invention is described below by way of the low voltage wire harness 15.

<Manufacture of Wire Harness 15>

In FIG. 1B, the long wire harness 15 arranged through the vehicle underfloor 11 includes a harness main body 19 and two connectors 20 (externally connecting devices) respectively arranged on the two terminals of the harness main body 19. The wire harness 15 also includes a fixing member (for example, a clamp) used to arrange itself at a specific position, and a water stop member (for example, a grommet) (not shown).

<Manufacture of Harness Main Body 19>

In FIGS. 2 to 5, the harness main body 19 includes two conductive paths 21 and an exterior member 22 according to the invention for accommodating and protecting the two conductive paths 21. Here, the number of conductive paths 21 is two in this embodiment. However, this is an example (it may also be one or three or more. A case using one conductive path is described later in an embodiment 2.). Also, the exterior member 22 may also employ a manufacturing method and a structure which can accommodate and protect the high voltage wire harness 9 as well. Firstly, description is given of manufacture and structure of the conductive path 21 in the harness main body 19 and, next, of manufacture and structure of the exterior member 22.

<Manufacture and Structure of Conductive Path 21>

The conductive path 21 includes a conductor and an insulator for covering the conductor The conductor is formed of copper, copper alloy, or aluminum or aluminum alloy such that it has a circular section. The conductor may have a conductor structure of twisted sheath wires, or a rod-shaped conductor structure having a rectangular or circular (round) section (for example, a conductor structure having a single angular core or a single round core; in this case, the wire itself also has a rod-like shape) (in the embodiment 1, there is employed a structure having a conductor section area of, for example, 15 sq). In such conductor, an insulator formed of insulating resin material is extrusion molded on the outer surface thereof.

The insulator is extrusion molded on the outer peripheral surface of the conductor using thermoplastic resin material. The insulator is formed as a coating having a circular section. The insulator is formed to have a specific thickness. As the thermoplastic resin, there can be used various kinds of well-known resin materials; and, it can be selected properly from polymer resin such as polyvinyl chloride resin, polyethylene resin and polypropylene resin. Here, reference numeral 23 designates the outer peripheral surface of the conductive path 21 (here, it corresponds to the outer peripheral surface of the insulator).

<Manufacture and Structure of Exterior Member 22 of the Invention>

The exterior member 22 is formed by resin molding to have a single straight tubular shape (it is straight before used. Here, the material is not limited to resin but metal may also be used.). The exterior member 22 is formed into a non-slit shape. In other words, it is formed in a non-slit shape. Further, the exterior member 22 has a circular section (in this embodiment, it has a circular shape; but, this is an example and thus, for example, it may also have an oblong, elliptical or rectangular shape.).

The exterior member 22 includes a flexible tube part 24 having a flexible property (see FIG. 6) and a straight tube part 25 serving as part in which the conductive path 21 is arranged straight. The flexible tube part 24 and straight tube part 25 are formed two or more respectively. Also, they are arranged alternately In FIG. 6, the flexible tube part 24 is arranged according to the mounting part shape of the vehicle (the shape of the vehicle part on which the wire harness is to be arranged; the shape of the target part to which the wire harness is to be arranged). Also, the flexible tube part 24 is formed to have a length according to the vehicle mounting part shape. The flexible tube parts 24 are not fixed in length, but are formed respectively to have required lengths to the vehicle mounting part shape. The flexible tube parts 24 are formed such that they can be flexed at desired angles when the wire harness 15 (see FIGS. 1A and 1B) is packaged or transported, or when it is arranged in a route for the vehicle. That is, the flexible tube part 24 is formed such that it can be flexed into a bent shape and also, as shown in the drawings, it can be returned to its original straight state (the state when it is resin molded.

In this embodiment, the flexible tube parts 24 are formed in bellows tube shapes (the shape is not limited specifically so long as it has flexibility) Specifically, the flexible tube parts 24 each include a bellows recess section and a bellows projection section in the peripheral direction, and the bellows recess sections and bellows projection sections are formed to continue alternately in the tube axial direction.

In FIGS. 2 to 7, the straight tube part 25 is formed as a part which does not have such flexibility as the flexible tube pipe part (see FIG. 6). Also, the straight tube part 25 is formed as an unbending part when the wire harness is packaged or transported, or when it is arranged in a route for the vehicle (the unbending part means a part to which flexibility is not provided actively). The straight tube part 25 in the drawings has a long straight tube shape.

The straight tube part 25 is formed as a rigid part when compared with the flexible tube part 24 (see FIG. 6). The straight tube part 25 is formed to have a position and a length to the vehicle mounting part shape. The straight tube part 25, in this embodiment, is formed as a part to be arranged at least on the vehicle underfloor 11 (see FIGS. 1A and 1B). In some or all of the straight tube parts 25, there are integrally formed multiple projections 26 that are the characteristic parts of the invention.

<Multiple Projections 26 that are the Characteristic Parts of the Invention>

The multiple projections 26 are respectively formed to project inward from the tube inner surface 27 of the straight tube part 25. They respectively have a shape extending in a substantially arc-like manner in the tube inner peripheral direction. They are further arranged alternately zigzag along the tube axial direction. Here, with respect to the above-mentioned "tube inner peripheral direction", the inner periphery of the tube may also include the inner periphery in a direction perpendicular to the tube axis or the inner periphery in a direction crossing obliquely the tube axis. Also, the arrangement of the projections is not limited to the arrangement as shown in FIG. 3 in which the projections are arranged zigzag one by one but, for example, they can also be arranged zigzag two by two.

Figure 10:
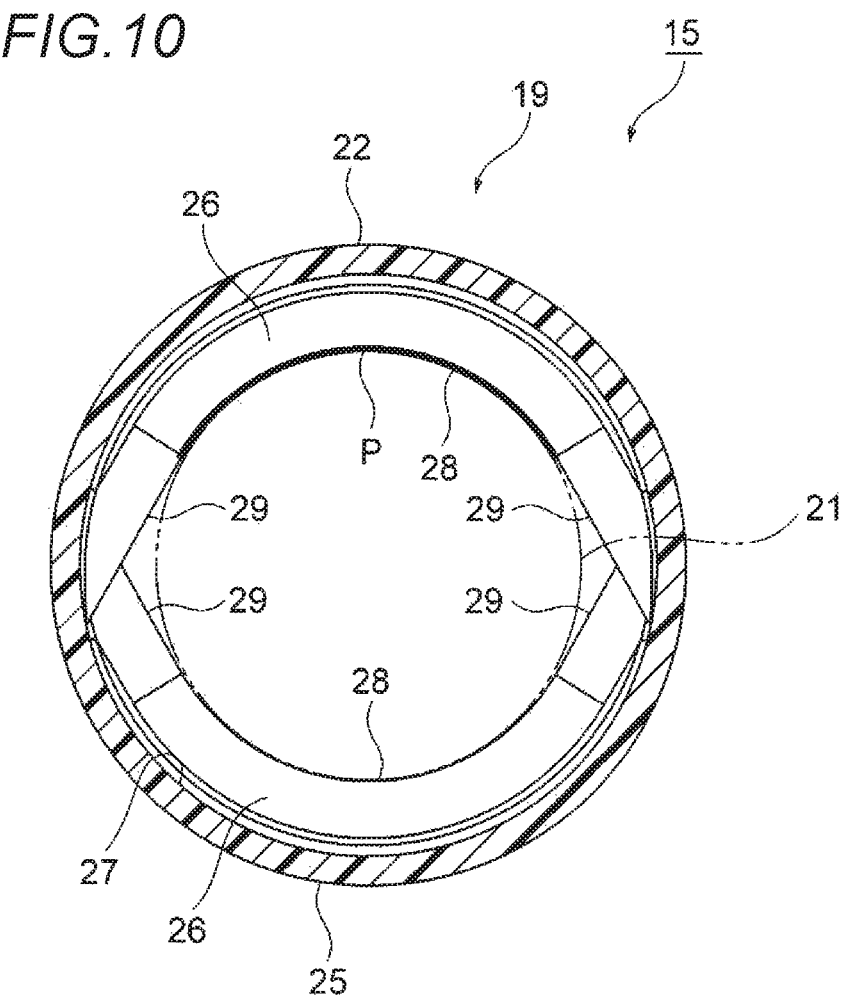
FIG. 10 is a section view of the embodiment 2, taken along the F-F line of FIG. 8.

Describing the multiple projections 26 a bit more specifically, each section 26 includes an round portion 28 extending substantially in an arc shape in the tube inner peripheral direction and two substantially oblique-shaped oblique portions 29 respectively continuing from the two ends of the round portion 28 to the tube inner surface 27. Also, the section shape of each section 26 along the tube axial direction has a substantially U-like smooth surface. Further, each section 26 extends in a length exceeding the half periphery of the tube inner surface 27 in the tube inner peripheral direction (an example of a length equal to or less than the half periphery of the tube inner surface 27 is described later in an embodiment 3. In the case of the two conductive paths 21 as in this embodiment, the multiple projections 26 may apply pressure to (or, simply touch) the outer peripheral surfaces 23 of the conductive paths 21 at the positions of the oblique portions 29. The "pressure" is typically shown by the thin line of the reference sign P. The pressure application locations differ according to the number of conductive paths 21, which is shown in FIG. 10 relating to an embodiment 2 to be described later.

Here, although not shown specifically, the exterior member 22 is resin molded using a well-known extruder and a metal mold having multiple projection-like parts on the mold inner surface (which is an example). Specifically, a tube-shaped extruded product pushed out in a tube manner from the nozzle of the extruder is pressed against the multiple projection-like parts of the metal mold and vacuum sucked, thereby resin molding the exterior member. The multiple projections 26 are formed by the multiple projection-like parts of the metal mold inner surface.

<Operation of the Invention>

In the above manufacture and structure, as shown in FIG. 3, the multiple projections 26 are formed on the tube inner surface 27 of the exterior member 22. Therefore, when the conductive path 21 is inserted form the one-end side opening of the exterior member 22 toward the other-end side opening, the conductive path 21 is moved while changing its direction toward the side (see FIG. 3) where the projections 26 do not exist. When the conductive path 21 is inserted and is completely accommodated and protected in the exterior member 22, the conductive path 21 is held by the multiple projections <Summary and Effects of the Invention>

As has been described heretofore with reference to FIGS. 1A to 7, the wire harness 15 includes the tubular exterior member 22 and two conductive paths 21 to be inserted into the exterior member 22. The exterior member 22 is formed to have a non-slit shape. Also, on the tube inner surface 27 of the straight tube part 25 of the exterior member 22, there are formed the multiple projections 26. In the exterior member 22, the multiple projections 26 are arranged according to positions where the movements of the conductive paths 21 must be suppressed. Thus, the conductive paths 21 can be made hard to move or can be held not to move.

Therefore, according to the exterior member 22 and wire harness 15 of the invention, the motion of the conductive paths 21 can be suppressed at desired positions, thereby enabling prevention of scratch or the like on the conductive path 21 side. Also, according to the exterior member 22 and wire harness 15 of the invention, since the exterior member 22 is formed in a non-slit shape, waterproof property, dustproof property and the like can be secured, thereby enabling elimination of ill influences on the conductive path 21 side.

Further, according to the exterior member 22 and wire harness 15 of the invention, since the multiple projections 26 are respectively formed to have a substantially U-shaped section and also to have a smooth surface, the conductive paths 21 can be smoothly inserted into the exterior member 22, whereby workability can be taken into consideration.

[Embodiment 2]

Figure 8:
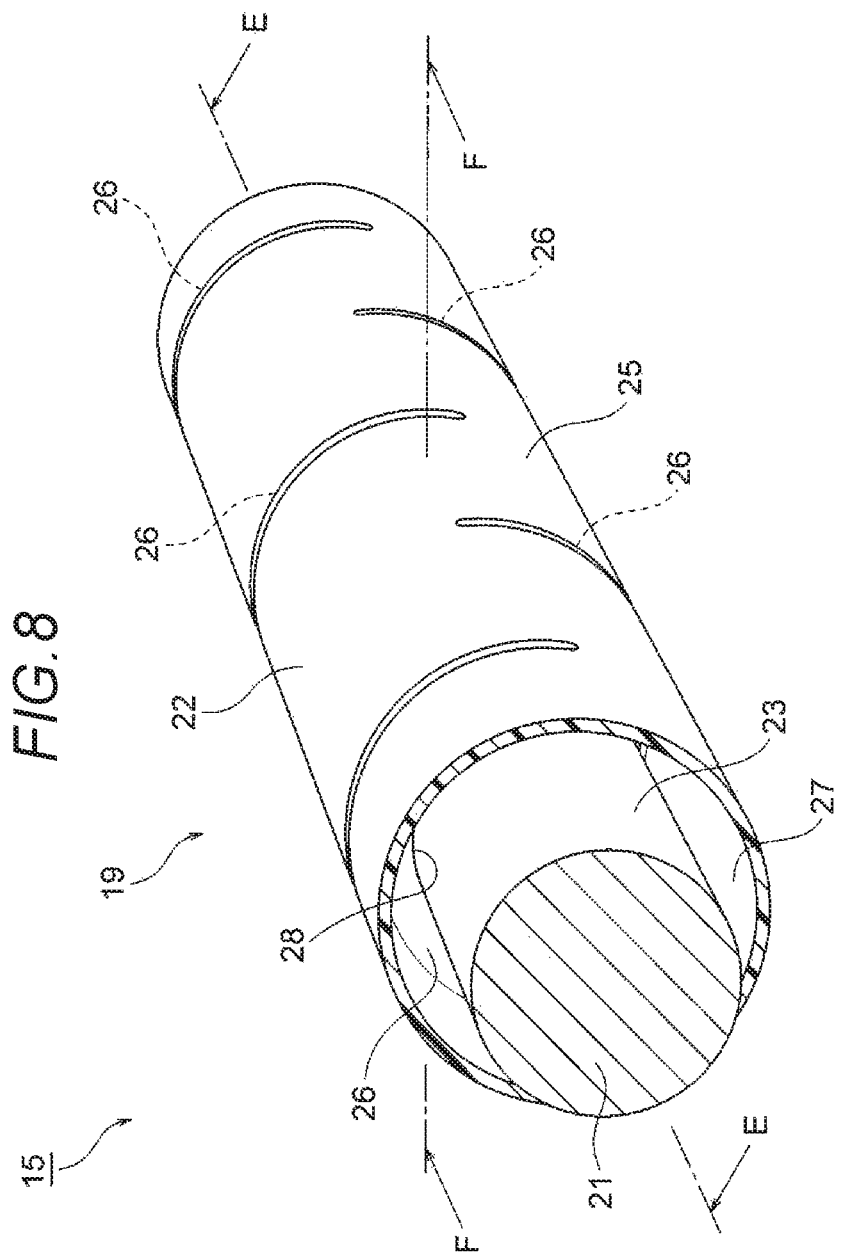
FIG. 8 is a perspective view of an exterior member and a wire harness according to an embodiment 2 of the invention.
Figure 9:
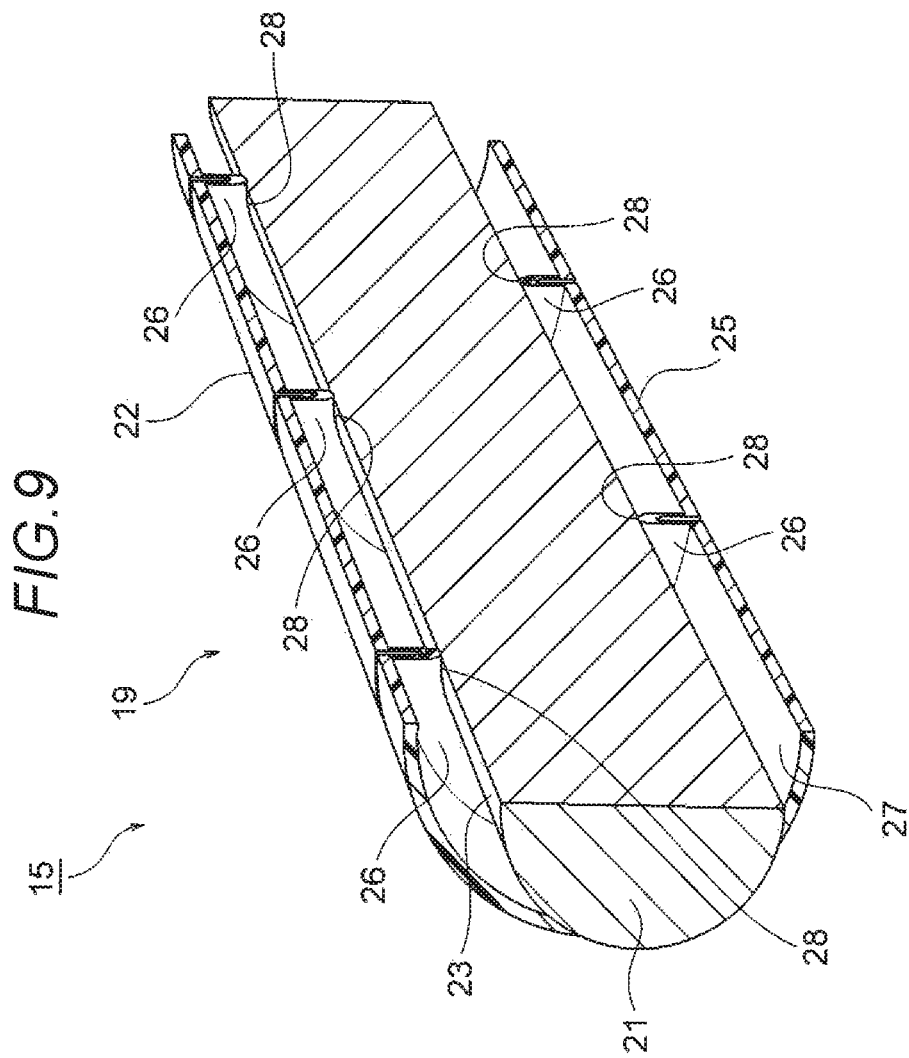
FIG. 9 is a section view of the embodiment 2, taken along the F-F line of FIG. 8.

Description is given below of an embodiment 2 with reference to the drawings. FIG. 8 is a perspective view of an exterior member and a wire harness according to another embodiment of the invention. Also, FIG. 9 is a section view taken along the E-E line of FIG. 8, and FIG. 10 is a section view taken along the F-F line of FIG. 8. Here, the same composing parts substantially as the embodiment 1 are given the same reference numerals and thus the specific description thereof is omitted.

<Manufacture of Wire Harness 15>

In FIGS. 8 to 10, a harness main body 19 of a wire harness 15 is manufactured such that it includes a thick conductive path 21 and an exterior member 22 for accommodating and protecting the conductive path 21. The embodiment 2 employs a conductive path 21 having a conductor section area of, for example, 70 sq. This single conductive path 21 is inserted into the exterior member 22 having the same multiple projections 26 as the embodiment 1 and is accommodated and protected therein. The single conductive path 21 is accommodated in such a state where the outer surface 23 thereof is pressed by the round portions 28 of the multiple projections 26, whereby it substantially meanders gradually.

<Effects of the Invention>

The embodiment 2, of course, provides similar effects to the embodiment 1. That is, it can provide the exterior member 22 capable of preventing invasion of water and suppressing the movement of the conductive path 21, and the wire harness 15 including such exterior member 22.

[Embodiment 3]

Figure 11:
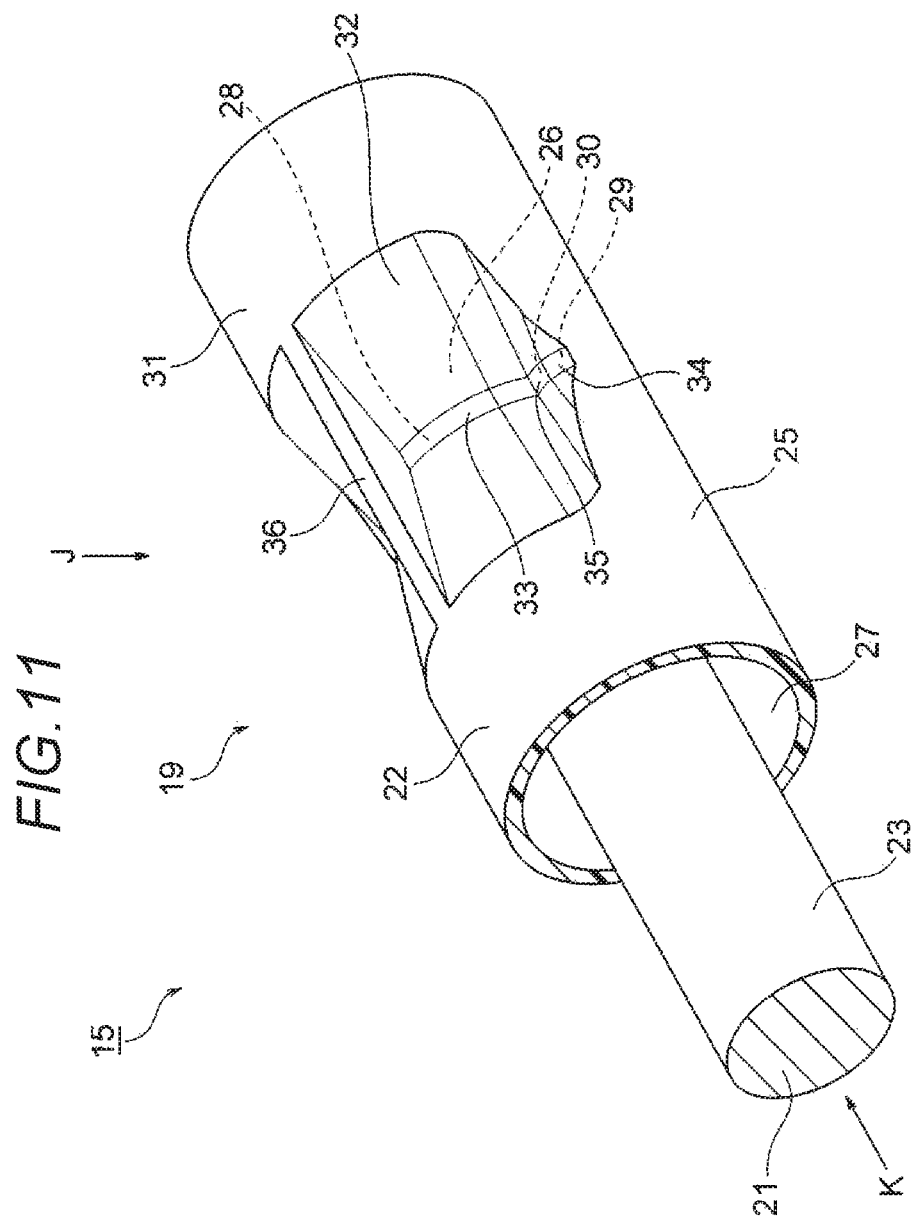
FIG. 11 is a perspective view of an exterior member and a wire harness according to an embodiment 3 of the invention.
Figure 12A:
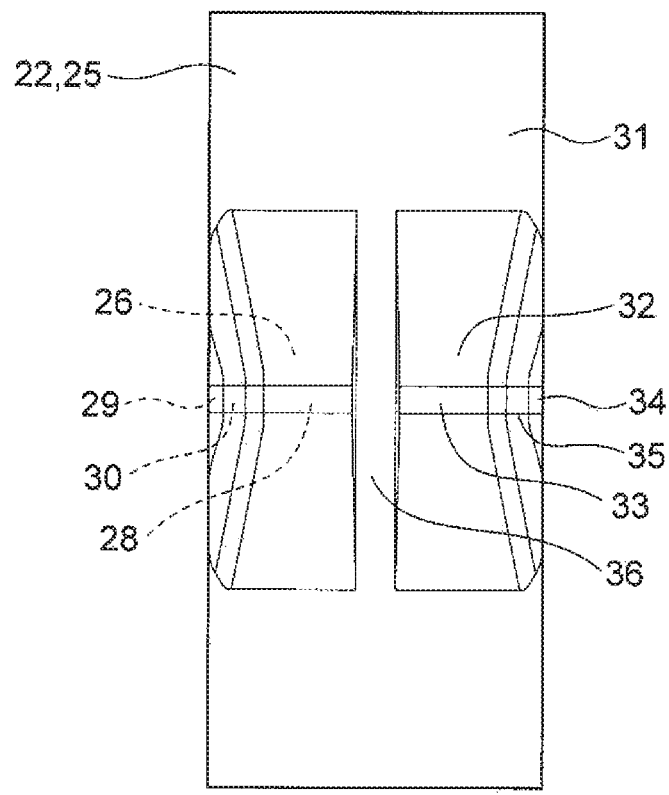
FIGS. 12A and 12B show the exterior member of the embodiment 3 shown in FIG. 11.
Figure 12B:
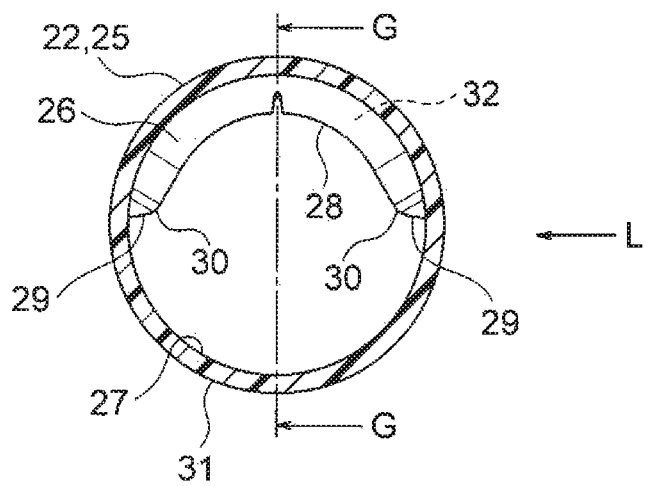
Figure 13:
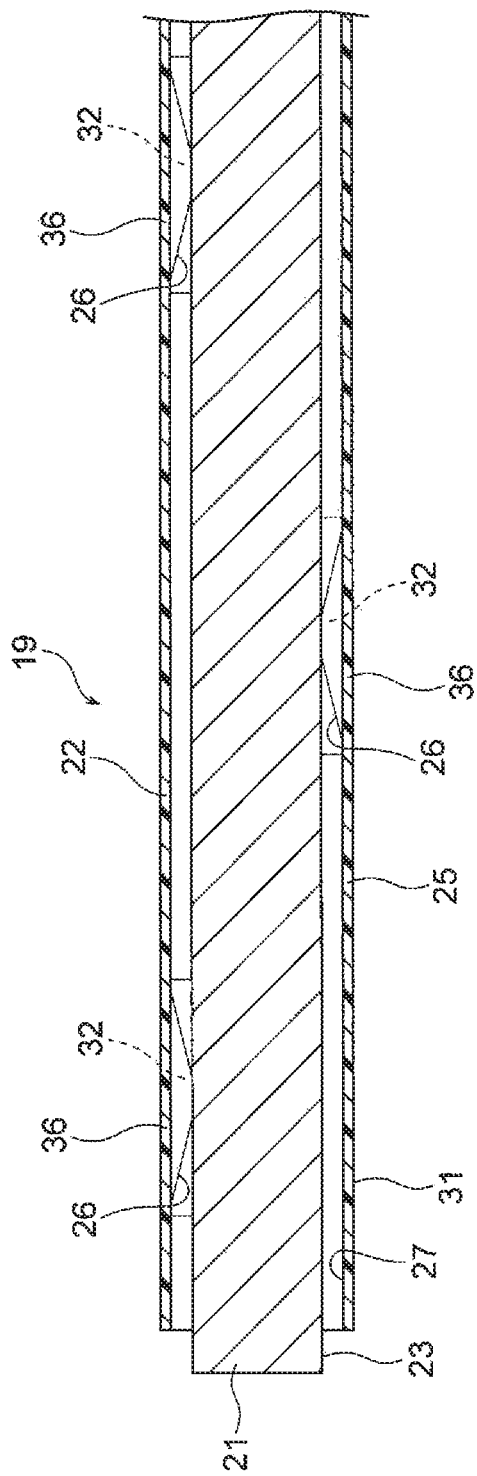
FIG. 13 is a section view (including a conductive path) taken along the G-G line of FIG. 12B.
Figure 14A:
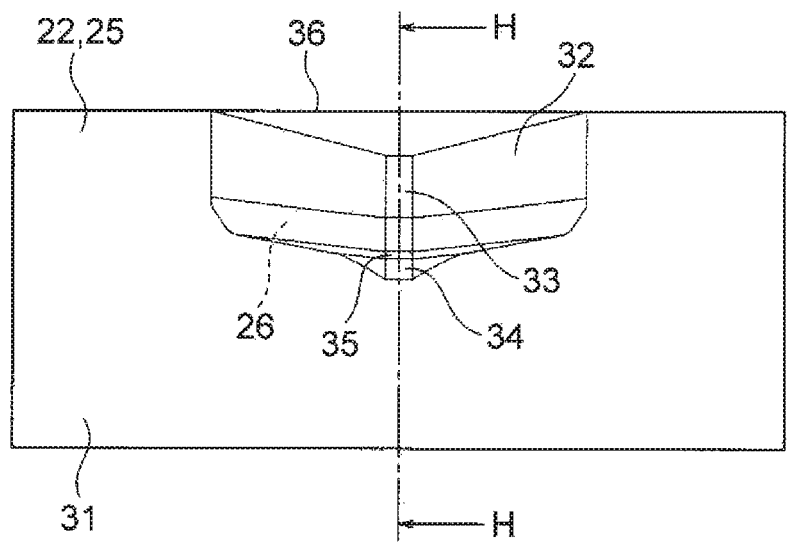
FIGS. 14A and 14B show the exterior member of the embodiment 3 shown in FIGS. 12 A and 12B.
Figure 14B:
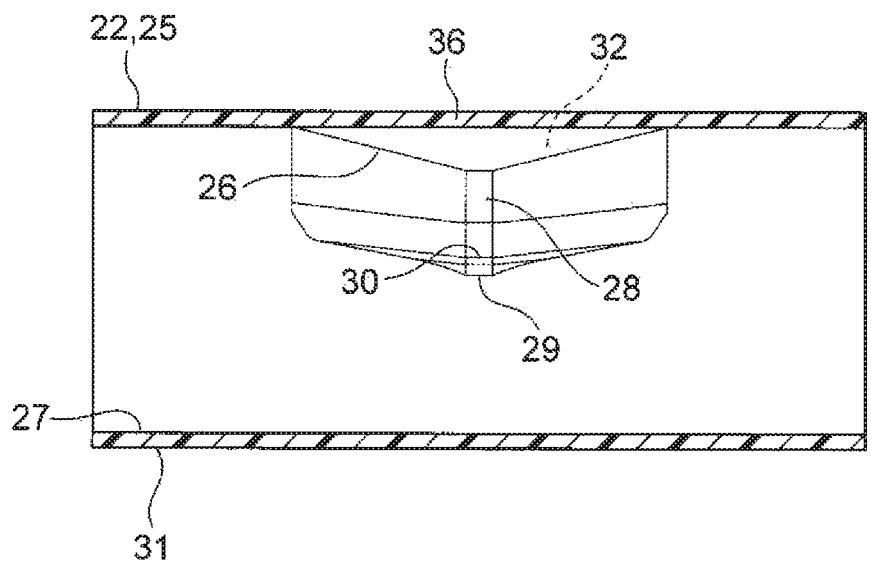
Figure 15:
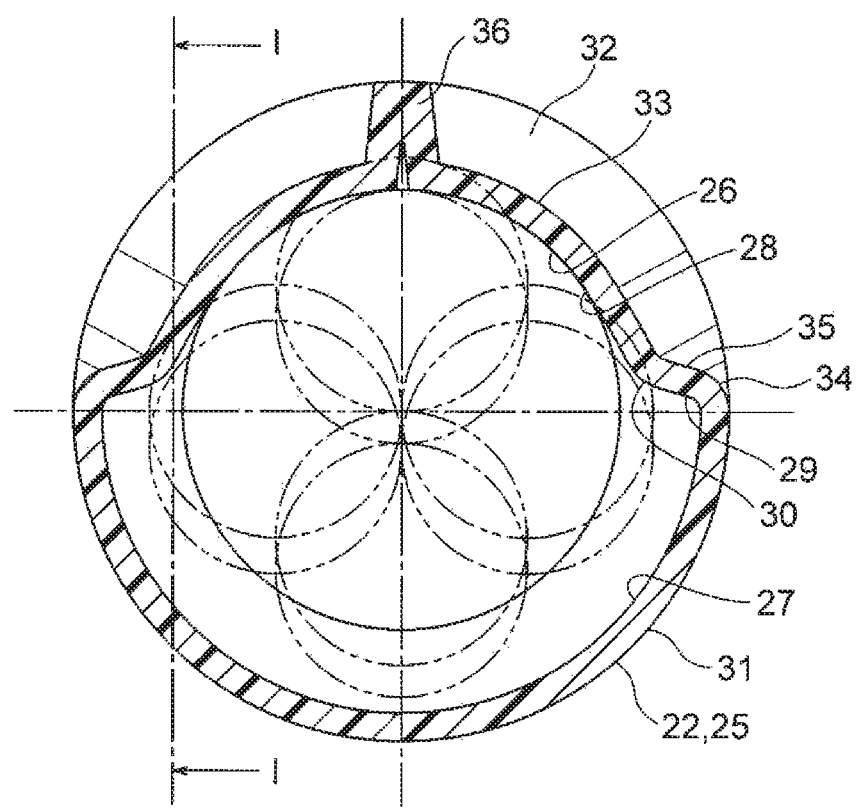
FIG. 15 is a section view of the embodiment 3, taken along the H-H line shown in FIG. 14A.

Description is given below of an embodiment 3 with reference to the drawings. FIG. 11 is a perspective view of an exterior member and a wire harness according to a still another embodiment of the invention. Also, FIGS. 12A and 12B show an exterior member shown in FIG. 11, FIG. 13 is a section view (including a conductive path) taken along the G-G line of FIG. 12B, FIGS. 14A and 14B show the exterior member of FIGS. 12A and 12B, FIG. 15 is a section view taken along the H-H line of FIG. 14A, and FIG. 16 is a section view taken along the I-I line of FIG. 15. Here, the same composing parts as the embodiments 1 and 2 are substantially given the same reference numerals and signs and thus the specific description thereof is omitted.

<Manufacture of Wire Harness 15>

In FIGS. 11 to 16, a harness main body 19 of a wire harness 15 is manufactured such that it includes a single conductive path 21 and an exterior member 22 for accommodating and protecting the single conductive path 21. Here, FIGS. 15 and 16 show a state where, instead of using the single conductive path 21, conductive paths are arranged two vertically and two horizontally. The number of conductive paths 21 is not limited specifically.

The embodiment 3 is slightly different from the embodiments 1 and 2 in the structure of the projections 26 of the exterior member 22 and thus description is given of the embodiment 3 including such difference with reference to the drawings.

<Multiple Projections 26 that are the Characteristics of the Invention>

On the exterior member 22, for example, on the straight tube part 25 thereof, there are formed multiple projections 26 integrally therewith.

The multiple projections 26 are formed such that they respectively project inward from the tube inner surface of the straight tube part 27. Also, each of them has a shape extending substantially in an arc manner in the tube inner peripheral direction. Further, they are arranged alternately zigzag along the tube axial direction.

Each projection 26, as shown in the drawings, includes a round portion 28 extending substantially in an arc manner in the tube inner peripheral direction, two substantially oblique-shaped oblique portions 29 continuing from the two end sides of the round portion 28 to the tube inner surface 27, and two taper portions 30 respectively arranged at the continuing positions of the round portion 28 and oblique portions 29. Also, each projection 26 has a shape the section along the tube axial direction of which is substantially V shaped and also which has a smooth surface. Further, each projection 26 extends in the tube inner peripheral direction with a length equal to or smaller than the half periphery of the tube inner surface 27.

Here, in this embodiment, each projection 26 extends with a length equal to or smaller than the half periphery of the tube inner surface 27. This aims at simplifying the metal mold structure. That is, portions (projections) corresponding to the projections 26 may be formed only on one of two slit parts of a metal mold.

The taper portions 30 are formed as portions used to smooth the inserting operation of the conductive path 21. Formation of the taper portions 30 is arbitrary.

In the tube outer surface 31 of the straight tube part 25, there formed multiple recesses 32. The multiple recesses 32 are formed as recessed portions that are produced by the multiple projections 26. Each recess 32, as shown in the drawings, includes an R groove portion 33 the bottom of which has a substantially arc-like shape in the tube outer peripheral direction, two oblique portions 34 respectively continuing from the two end sides of the R groove portion 33, and two taper portions 35 arranged at the continuing positions of the R groove portion 33 and oblique portion 34. Also, each recess 32 includes a rib 36 at the middle position thereof (such as the center position). The rib 36 extends straight along the tube axis direction. The rib 36 is used as a reinforcing part. Here, such rib 36, of course, may also be applied to the embodiments 1 and 2 as well.

The embodiment 3, of course, provides similar effects to the embodiments 1 and 2. That is, it can provide the exterior member 22 capable of preventing invasion of water and suppressing the movement of the conductive path 21, and the wire harness 15 including such exterior member 22.

The embodiment 3, as the effect of the rib 36, can prevent the lowered rigidity of the exterior member 22.

Further, of course, the invention can be changed variously without changing the subject matter of the invention.

DESCRIPTION OF REFERENCE NUMERALS AND SIGNS

1: Hybrid vehicle
2: engine
3: Motor unit
4: inverter unit
5: Battery
6: engine room
7: Vehicle rear part
8, 9: wire harness
10: Middle part
11: vehicle underfloor
12: Junction block
13: harness terminal
14: Shield connector
15: wire harness
16: Low voltage battery
17: vehicle front part
18: Supplementary device
19: harness main body
20: Connector
21: conductive path
22: Exterior member
23: outer peripheral surface
24: Flexible tube part
25: straight tube part
26: Projection
27: tube inner surface
28: round portion
29: oblique portion
30: Taper portion
31: tube outer surface
32: Recess
33: R groove portion
34: Oblique portion
35: taper portion
36: Rib

What is claimed is:

1. An exterior member which is tubular and which accommodates and protects one or multiple conductive paths, the exterior member comprising:
   a non-slit shape; and
   multiple projections which project on a tube inner surface of the exterior member,
   wherein the multiple projections respectively have substantially arc-like shapes extending in a tube inner peripheral direction, and the multiple projections are arranged zigzag alternately along a tube axial direction such that a portion of the tube inner surface that opposes a respective one of the multiple projections lacks the multiple projections.

2. The exterior member according to claim 1,
   wherein each of the multiple projections includes a round portion extending in a substantially arc-like shape in the tube inner peripheral direction, and two oblique portions which respectively continue from the round portion to the tube inner surface and are substantially oblique-shaped, and
   wherein each of the multiple projections includes a section along the tube axial direction which is a substantially U-shaped or V-shaped smooth surface.

3. The exterior member according to claim 2,
   wherein each of the multiple projections includes a shape extending in a length equal to or shorter than a half periphery of the tube inner surface.

4. The exterior member according to claim 2,
   wherein each of the multiple projections includes a shape extending in a length exceeding a half periphery of the tube inner surface.

5. The exterior member according to claim 4, wherein the length of each of the multiple projections is not equal to or not longer than a whole periphery of the tube inner surface.

6. The exterior member according to claim 1, further comprising:
ribs extending along the tube axial direction,
wherein each of the ribs is arranged on each of recesses which are formed on a tube outer surface of the exterior member by the multiple projections.

7. The exterior member according to claim 1 further comprising:
a straight tube part having a straight tube-like shape,
wherein the multiple projections are arranged on the straight tube part.

8. A wire harness comprising:
the exterior member which is tubular and which accommodates and protects one or multiple conductive paths; and,
one or multiple conductive paths which are accommodated into and protected by the exterior member,
wherein the exterior member comprising:
a non-slit shape; and
multiple projections which project on a tube inner surface of the exterior member,
wherein the multiple projections respectively have substantially arc-like shapes extending in a tube inner peripheral direction, and the multiple projections are arranged zigzag alternately along a tube axial direction.

* * * * *